United States Patent [19]

Worster

[11] Patent Number: 4,482,846
[45] Date of Patent: Nov. 13, 1984

[54] TELEVISION LINE DEFLECTION ARRANGEMENT

[75] Inventor: Frederick E. Worster, Redhill, England

[73] Assignee: U.S. Philips Corporation, New York, N.Y.

[21] Appl. No.: 400,839

[22] Filed: Jul. 22, 1982

[30] Foreign Application Priority Data

Aug. 14, 1981 [GB] United Kingdom ............... 8124869

[51] Int. Cl.³ ............................................. H01J 29/56
[52] U.S. Cl. ...................................... 315/371; 358/60
[58] Field of Search ............... 315/370, 371, 398, 368; 358/60

[56] References Cited

U.S. PATENT DOCUMENTS 4,093,895  6/1978  Collette ............................ 315/371
4,198,591  4/1980  Ohmori ............................ 315/371
4,375,046  2/1983  Lehnert ............................ 358/60

Primary Examiner—Theodore M. Blum
Attorney, Agent, or Firm—Thomas A. Briody; William J. Streeter

[57] ABSTRACT

A circuit arrangement for correcting tilt and bow distortions in a raster scan display comprising a series arrangement of a current limiting inductor and diodes poled in opposite directions, which series arrangement is connected in parallel with the line deflection coil. A transistor is connected in parallel with one diode. In the absence of a control signal for the transistor the circuitry shunting the deflection coil acts as a centering circuit with a static offset current being produced through said coil which produces a static magnetic bias in the direction of line deflecton. To correct the geometric distortion the transistor receives a field frequency signal input which modulates it impedance at field frequency to produce a modulated magnetic bias through the deflection coil.

13 Claims, 6 Drawing Figures

TELEVISION LINE DEFLECTION ARRANGEMENT

The invention relates to a line deflection arrangement for television display apparatus, said arrangement comprising a line deflection coil, means for producing a line deflection current of substantially sawtooth shape through said line deflection coil, and means for producing a static magnetic bias in the direction of the deflection magnetic field produced by said line deflection coil when energised by said line deflection current.

Such an arrangement is known from U.S. Pat. No. 3,944,882 for use in television receivers to centralise a raster in the line (horizontal) direction on a television display. It may be necessary when the vertical center of the display does not coincide with the vertical center of the raster due to misalignment of the line deflection coils on the deflection unit, or of the deflection unit on the display tube; or of the electron gun assembly within the neck of the display tube, or due to a combination of such misalignments. The need to centralise a raster may also arise in projection colour television due to the possible effect of the combination of such misalignments with each of the three projection cathode ray tubes.

Other geometric distortions may also be present in television displays of the projection and direct view types. One such error known as tilt may produce a raster in the form of a non right-angled parallelogram and gives the appearance that the vertical sides of the raster are tilted (both in the same direction) with respect to their correct positions. Such an error may be produced by the field deflection coil not being correctly and orthogonally positioned with respect to the line deflection coil on a deflection unit. Such an error is usually overcome by ensuring the correct relative positions of such coils. This can prove expensive due to the time that such an operation may take. Another geometric distortion may be that known as bow where the vertical sides of the raster are bowed (again both in the same direction) and which may be produced by each of the two outer projection tubes in a projection colour television display due to their offset positioning relative to the display screen.

It is an object of the present invention to provide a line deflection arrangement which can reduce or even substantially eliminate such tilt and/or bow distortions.

The present invention is characterised in that the above discussed arrangement further comprises the series arrangement of a current limiter and a unidirectional current conducting element which series arrangement is connected in parallel with said line deflection coil, and a variable impedance connected in parallel with said element which impedance is adapted to have its impedance varied over a field period to cause said deflection coil to produce a magnetic bias in said direction which varies dynamically over said field period, said dynamic bias being superimposed on said static magnetic bias.

The series arrangement may additionally comprise a second unidirectional current conducting element poled for conduction in a direction opposite to that of said first mentioned unidirectional current conducting element, said second element having an impedance connected in parallel therewith, the parallel network so formed producing a static offset current through said deflection coil to consequently produce said static magnetic bias, the variable impedance in parallel with the first mentioned element comprising a device having a main current path connected in parallel with the first element and a control input for receiving a field frequency signal for producing the required dynamic variation of the main current path. The device may then be a bipolar transistor whose emitter-collector path comprises the main current path and whose base comprises the control input. The field frequency signal may be a field frequency sawtooth for the correction of tilt in the field (vertical) direction of the display of the television display apparatus or may be a field frequency parabola for the correction of bow in the field (vertical) direction of the display. The field frequency signal may be derived from the output of an operational amplifier whose output is connected to the control input of the device through an opto-isolator. This is particularly useful when the device floats at a voltage well above that of the operational amplifier.

The invention also provides projection colour television display apparatus comprising three projection cathode ray tubes where at least two of said projection tubes are each provided with an associated line deflection arrangement as described above.

The above and other features of the invention will be described by way of example with reference to the accompanying drawings in which.

Figure 1:
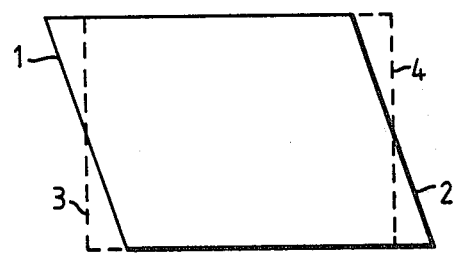
FIG. 1 represents a television display with tilt distortion.
Figure 2:
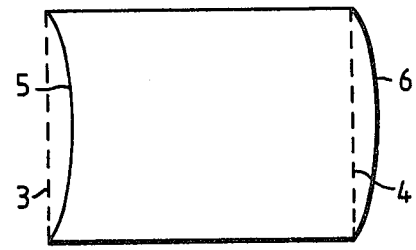
FIG. 2 represents a television display with bow distortion.

FIG. 1 shows a television display raster which has been subjected to tilt distortion whereby the vertical sides 1 and 2 as displayed lie at angles other than right angles to the horizontal sides of the display. The display once corrected would take the form shown by the broken lines such that sides 1 and 2 are returned to their proper vertical positions 3 and 4. FIG. 2 shows a television display raster which has been subjected to bow distortion whereby vertical sides 5 and 6 are both curved in the same direction and need to be restored to the shapes shown by the broken lines 3 and 4. The reasons for the production of the distorted displays shown in FIGS. 1 and 2 have been discussed in the introduction of this specification and it is quite possible that a display having both distortions might be present in a colour projection television system.

Figure 3:
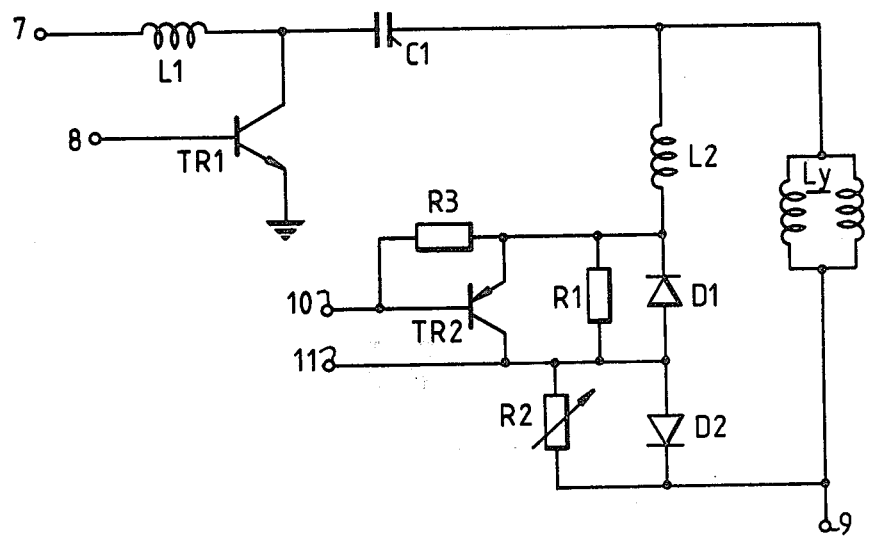
FIG. 3 is a circuit diagram of an arrangement according to the invention for correcting the above distortions.

FIG. 3 shows a line deflection arrangement which may be used to correct the distortions shown in FIG. 1 and/or FIG. 2. The arrangement comprises an npn transistor TR1 which forms the line output transistor of a line output stage. The collector of transistor TR1 is connected through an inductor L1 to a terminal 7 which is connected to the positive terminal of a high voltage (typically 150 volts) supply. The inductor L1 may form the primary winding of a line output transformer the secondary windings of which are not shown in this Figure. The collector of transistor TR1 is also connected through a capacitor C1 to a line deflection coil Ly the lower end of which is connected to a terminal 9 which in turn can be connected to earth or where required to some means for modulating the effective supply voltage across the deflection coil Ly for the correction of pin-cushion distortion in the East-West direction of the display. The deflection coil Ly may be constructed as shown by two coil halves connected in parallel. The capacitor C1 is the trace capacitor and provides S correction in known manner for the deflection produced by the deflection coil Ly.

The junction of capacitor C1 and deflection coil Ly is connected to the series arrangement of an inductor L2, a first semiconductor diode D1 and a second semiconductor diode D2, the lower end of this series arrangement being connected to the junction of deflection coil Ly and terminal 9 so that the series arrangement is in parallel with the line deflection coil Ly. It will be seen that the diodes D1 and D2 are poled for conduction in opposite directions, for example as shown, i.e. with the anodes interconnected. A resistor R1 and the emitter-collector path of a pnp transistor TR2 are each connected in parallel with diode D1 while a variable resistor R2 is provided in parallel with diode D2. The base of transistor TR2 is connected to a terminal 10 while the collector of this transistor is connected to a terminal 11, its base-emitter junction being shunted by a resistor R3. Between the terminals 10 and 11 is applied a signal at field frequency of the form necessary to provide correction for the distortion(s) present in the raster. If the distortion be that of tilt then the field frequency signal applied between terminals 10 and 11 will be of sawtooth shape while if the distortion to be corrected is bow then this signal will be of parabolic shape. Where both distortions are present in the display raster the applied field frequency signal will be a combination of sawtooth and parabola.

In operation, components C1, L1, Ly, TR1 and other associated components not shown operate in conventional manner to produce a substantially sawtooth shaped line deflection current through the line deflection coil Ly. Transistor TR2 is biased for class A operation by means of a quiescent bias applied terminals 10 and 11 such that it sits at the centre of it operating swing. The field frequency signal applied between terminals 10 and 11 can change the degree of conduction of transistor TR2 such that it effectively forms a variable resistor provided in parallel with diode D1 and resistor R1.

Figure 4:
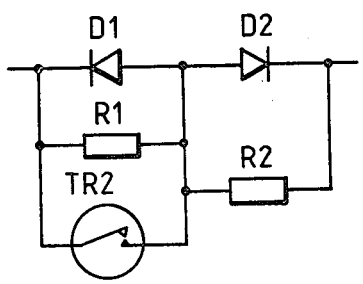
FIGS. 4 and 5 show a part of FIG. 3 under different operating conditions.
Figure 5:
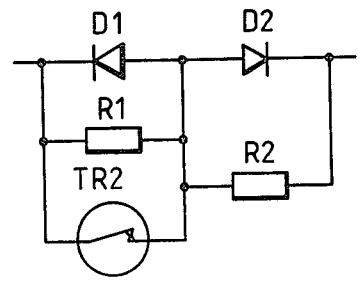

The extreme conditions of conduction of transistor TR1 are shown in FIGS. 4 and 5 both of which show part of the circuit present in FIG. 3 where like reference numerals indicate like components. In FIG. 4 the signal applied to transistor TR2 is assumed to be such as to render that transistor non conducting. Thus in FIG. 4 transistor TR2 is shown as a switch with its contacts open such that only resistor R1 is parallel with diode D1. In such a condition the circuit will operate in the manner of the normal centring circuit where during one half of each line scan period current flows through diode D1 and resistor R2 while during the other half current flows in the opposite direction through diode D2 and resistor R1. If resistors R1 and R2 were of equal value the average current flowing through the components of FIG. 4 over a line period would be zero. The magnitude and direction of this average current can however be controlled by choosing appropriate values for resistors R1 and R2, the magnitude being limited by inductor 12. The resulting average current is deducted from the deflection current such that the magnitude of the deflection current is reduced during one half of each line period and increased during the other half and so effectively produces a static magnetic bias in the line deflection direction. It will be clear that this magnetic bias can be produced by means other than the circuitry shown in FIG. 3, for example by a permanent magnetic positioned on the deflection unit adjacent the line deflection coil or by some other means capable of producing a d.c. component through the deflection coil Ly.

In FIG. 5 it is assumed that the signal applied between terminals 10 and 11 is such as to cause transistor TR2 to be fully conductive or bottomed such that it effectively provides a short-circuit across diode D1 and resistor R1. Thus in FIG. 5 the transistor TR2 is shown as a switch in the closed or conducting condition. In this case the components D1 and R1 have no effect on the circuit and diode D2 will conduct only during the first half of each line scan period to decrease the current through the line deflection coil through the first half of each line scan period and correspondingly increase that current during the second half. With a conventional television display this would appear as a movement of the scanning raster to the right.

Between the two extreme conditions shown in FIGS. 4 and 5 are those where transistor TR2 exhibits various degress of conduction under the control of the field frequency signal appearing between terminals 10 and 11 and hence this transistor functions as a variable resistance in parallel with diode D1 and resistor R1 to change over each field period the effective resistance in parallel with diode D1. The change in this effective resistance in relation to that of resistor R2 produces a dynamic change over each field period in the relationship of the deflection current flowing during the first and second halves of each line period through the line deflection coil so as to modulate each line differently in order to compensate for the distortion(s) present on the display raster. The changing deflection current achieves this by producing a magnetic bias which either opposes or assists the deflection which varies dynamically over a field period.

Figure 6:
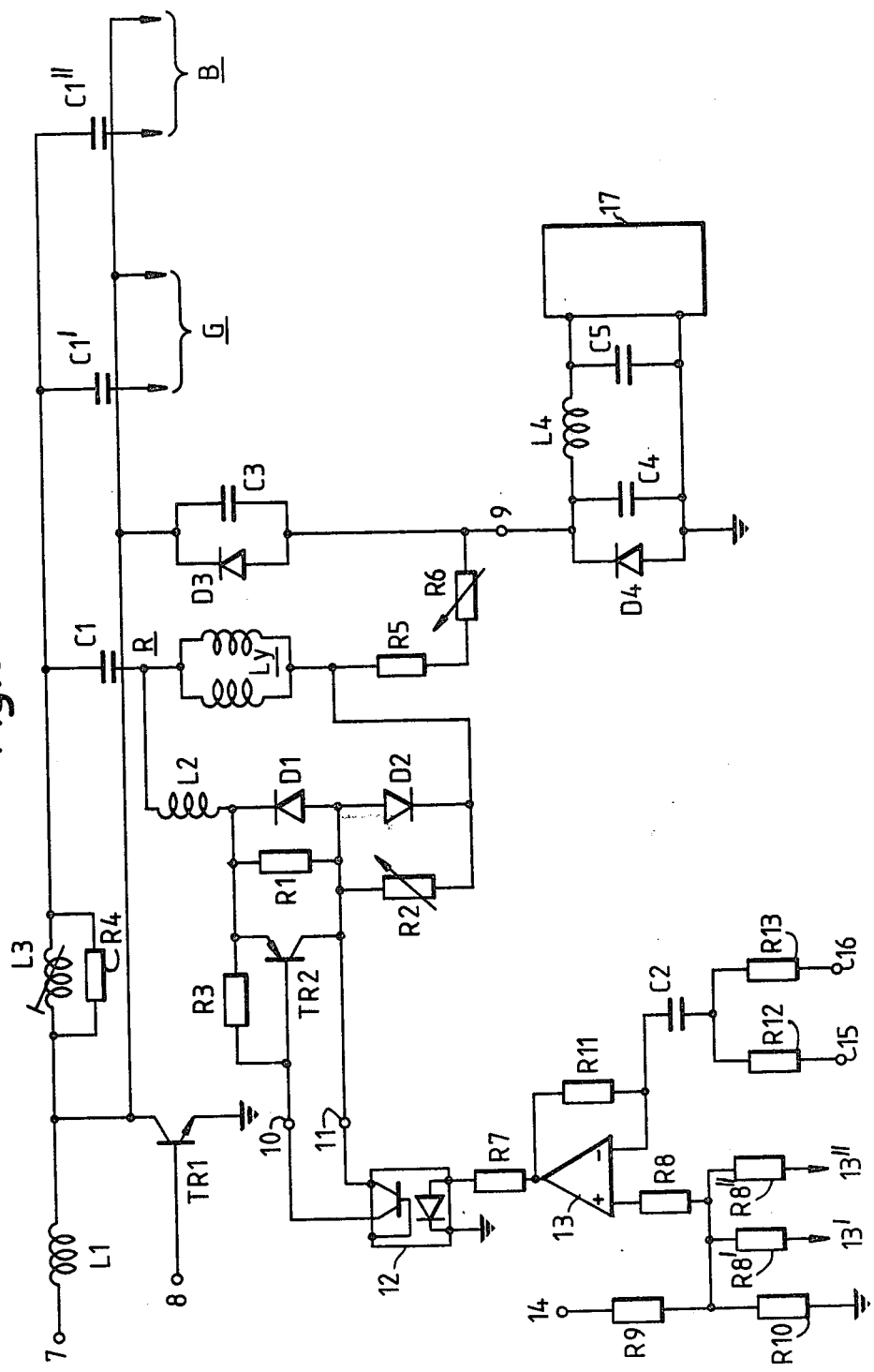
FIG. 6 is a more detailed circuit diagram of an arrangement according to the invention.

FIG. 6 shows a detailed embodiment of an arrangement for use in a projection television receiver for the three projection tubes thereof. Alternately geometric distortion correction for only two projection tubes may be provided. Like references between this Figure and FIG. 3 indicate like components. In addition to the components shown in FIG. 3 an adjustment for horizontal linearity is provided comprising a variable inductor L3 and a parallel resistor R4 and which are provided between the junction of winding L1 with transistor TR1 collector and the capacitor C1. The lower end of the deflection coil Ly remote from capacitor C1 is connected to terminal 9 through two series resistors R5 and R6, the latter of which is variable. The deflection coil circuit shown in detail is for use with the red (R) projection tube and both resistors R5 and R6 would be incorporated in that circuit. The corresponding circuit for the green (G) projection tube would only incorporate resistor R5 whilst that for the blue (B) projection tube would only incorporate variable resistor R6 which performs a linearity ajustment. The required quiescent bias and field frequency drive signal for application to terminals 10 and 11 is provided by a circuit having two inputs 15 and 16 the first (15) of which receives a parabola at field frequency for correcting for the bow distortion whilst the other (16) receives a sawtooth signal also at field frequency for correcting for tilt, both of these signals being adjustable. These two signals are connected through respective resistors R12 and R13 to a capacitor C2 where the signals are added before being applied to the inverting (−) input of an operational amplifier 13. The non-inverting (+) input receives a bias voltage from a resistor R8 which is connected to the junction of two resistors R9, R10 forming a potential divider between a terminal 14 for a low voltage supply (typically 12 volts) and earth. The junction also provides a corresponding bias for each of the corresponding amplifiers in the deflection coil circuits for the green and blue projection tubes which are respectively derived from two resistors R8' and R8" for connection to operational amplifiers 13', 13" (not shown). The output from the operational amplifier 13 is connected through a resistor R11 to its inverting input to provide negative feedback, the output also being connected through a resistor R7 to the input of a opto-isolator 12 which is used to provide isolation between the low voltage output from the operational amplifier and the relatively high voltage at which transistor TR2 floats. The resistive value of resistor R7 determines the quiescent bias applied to transistor TR2.

The parallel arrangement of a flyback diode D3 and a flyback capacitor C3 is connected between the junction of winding L1 with the collector of transistor TR1 and terminal 9. A second parallel circuit comprising a similarly poled diode D4 and a capacitor C4 is connected between terminal 9 and earth. A coil L4 is connected between terminal 9 and an output of a modulation circuit 17, the other output of which is connected to earth. Between these two outputs is connected a capacitor C5. The components C4, C5, D4, L4 and 17 form what has come to be known as a diode modulator circuit for modulating the effective supply voltage for the deflection coil Ly and which may provide for the correction of a raster distortion (typically pin-cushion) in the East-West direction. The operation of such a circuit is described in our U.K. patent specification No. 1,459,922, corresponding to U.S. Pat. No. 3,906,305, which is incorporated herein by way of reference.

The arrangement of FIG. 6 shows a further capacitor C1' and a further connection from the collector of transistor TR1 which will be taken to a deflection coil circuit G for the green projection tube and which in most respects corresponds to that for the red projection tube while an additional capacitor C1" and an additional connection also from the collector of transistor TR1 are taken to the deflection circuit B for the blue projection tube which correspond in a similar manner to these for the red and green projection tubes.

I claim:
1. In a line deflection arrangement for television display apparatus, said arrangement comprising a line deflection coil, means for producing a line deflection current of substantially sawtooth shape through said line deflection coil, means for producing a static magnetic bias in the direction of the deflection magnetic field produced by said line deflection the deflection magnetic field produced by said line deflection coil when energized by said line deflection current, the improvement comprising a series arrangement of a current limiter and a first unidirectional current conducting element, said series arrangement being connected in parallel with said line deflection coil, a variable impedance connected in parallel with said element, means varying said impedance over a field period to cause said deflection coil to produce a magnetic bias in said direction which varies dynamically over said field period, said dynamic magnetic bias being superimposed on said static magnetic bias.

2. A line deflection arrangement as claimed in claim 1 in which said series arrangement additionally comprises a second unidirectional current conducting element poled for condition in a direction opposite to that of said first unidirectional current conducting element, said second element having an impedance connected in parallel therewith, the parallel network so formed producing a static offset current through said deflection coil to consequently produce said static magnetic bias, and wherein the variable impedance in parallel with the first element comprises a device having a main current path connected in parallel with said first element and a control input for receiving a field frequency signal for producing the required dynamic variation of the main current path.

3. A line deflection arrangement as claimed in claim 2, wherein said device comprises a bipolar transistor whose emitter-collector path comprises the main current path and whose base comprises the control input.

4. A line deflection arrangement as claimed in claim 2 wherein said field frequency signal comprises a field frequency sawtooth for the correction of tilt in the field (vertical) direction of the display of said television display apparatus.

5. A line deflection arrangement as claimed in claim 2 wherein said field frequency signal comprises a field frequency parabola for the correction of bow in the field (vertical) direction of the display of said television display apparatus.

6. A line deflection arrangement as claimed in claim 2 wherein said field frequency signal is derived from the output of an operational amplifier whose output is connected to the control input of said device through an opto-isolator.

7. A line deflection arrangement as claimed in claim 3 wherein said field frequency signal comprises a field frequency sawtooth for the correction of tilt in the field (vertical) direction of the display of said television display apparatus.

8. A line deflection arrangement as claimed in claim 3 wherein said field frequency signal comprises a field frequency parabola for the correction of bow in the field (vertical) direction of the display of said television display apparatus.

9. A line deflection arrangement as claimed in claim 4 wherein said field frequency signal comprises a field frequency parabola for the correction of bow in the field (vertical) direction of the display of said television display apparatus.

10. A line deflection arrangement as claimed in claim 3 wherein said field frequency signal is derived from the output of an operational amplifier whose output is connected to the control input of said device through an opto-isolator.

11. A line deflection arrangement as claimed in claim 4 wherein said field frequency signal is derived from the output of an operational amplifier whose output is connected to the control input of said device through an opto-isolator.

12. A line deflection arrangement as claimed in claim 5 wherein said field frequency signal is derived from the output of an operational amplifier whose output is connected to the control input of said device through an opto-isolator.

13. A line deflection arrangement for projection television display apparatus having three projection cathode ray tubes, comprising: a line deflection coil for each tube, means for producing a line deflection current of substantially sawtooth shape through each line deflection coil, means for producing a static magnetic bias in the direction of the deflection magnetic field produced by each line deflection coil when energized by a said line deflection current, a series arrangement of a current limiter and a first unidirectional current conducting element associated with each line deflection coil, each series arrangement being connected in parallel with the associated line deflection coil, a variable impedance associated with each element, each variable impedance connected in parallel with the associated element, means varying each variable impedance over a field period to cause the associated line deflection coil to provide a magnetic bias in said direction which varies dynamically over said field period, said dynamic bias being superimposed on said static magnetic bias.

* * * * *